United States Patent
Bulgrien

(10) Patent No.: US 6,676,562 B1
(45) Date of Patent: Jan. 13, 2004

(54) AUTOMATIC CLUTCH ENGAGEMENT CONTROLLED BY ENGINE SPEED

(75) Inventor: Garth H. Bulgrien, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/197,879

(22) Filed: Jul. 19, 2002

(51) Int. Cl.[7] ............................................. B60K 41/24
(52) U.S. Cl. ...................... 477/74; 477/175; 192/3.63; 192/83
(58) Field of Search .................. 477/158, 74, 170, 477/175; 192/83, 3.63

(56) References Cited

U.S. PATENT DOCUMENTS

| | | | |
|---|---|---|---|
| 3,698,525 A | * 10/1972 | Grassmuck | .................. 477/175 |
| 4,618,043 A | * 10/1986 | Hattori et al. | ................. 477/85 |
| 4,723,644 A | * 2/1988 | Sakakiyama | ................. 477/175 |
| 5,083,648 A | 1/1992 | Bulgrien | |
| 5,097,724 A | * 3/1992 | Braun | .......................... 477/74 |
| 5,101,688 A | 4/1992 | Pearce et al. | |
| 5,105,675 A | 4/1992 | Langford et al. | |
| 5,217,097 A | * 6/1993 | Lasoen | .......................... 192/83 |
| 5,251,132 A | 10/1993 | Bulgrien | |
| 5,265,018 A | 11/1993 | Sokol et al. | |
| 5,267,157 A | 11/1993 | Churchill et al. | |
| 5,378,211 A | * 1/1995 | Slicker et al. | ............... 477/175 |
| 5,450,768 A | 9/1995 | Bulgrien et al. | |
| 5,679,098 A | * 10/1997 | Shepherd et al. | ........... 477/175 |
| 6,086,508 A | * 7/2000 | Kosik et al. | ................... 477/74 |
| 6,165,104 A | * 12/2000 | Streib | .......................... 477/175 |
| 6,394,930 B1 | * 5/2002 | Reuschel | ..................... 477/175 |

* cited by examiner

*Primary Examiner*—Saul Rodriguez
*Assistant Examiner*—Dennis Abdelnour
(74) *Attorney, Agent, or Firm*—John William Stader; Collin A. Webb

(57) ABSTRACT

In a vehicle transmission system including a transmission having an input shaft driven by an engine, an output shaft, and a clutch for controlling the transfer of torque from the input shaft to the output shaft, the clutch is controlled by sensing the speed of the engine and controlling engagement of the clutch according to the sensed engine speed. The system normally operates in a mode wherein clutch engagement is controlled according to the position of a clutch pedal. An auto-clutch mode, wherein engine speed controls clutch engagement is invoked when the transmission is in gear, brake pedals are depressed, and the engine speed is less than a predetermined speed.

13 Claims, 5 Drawing Sheets

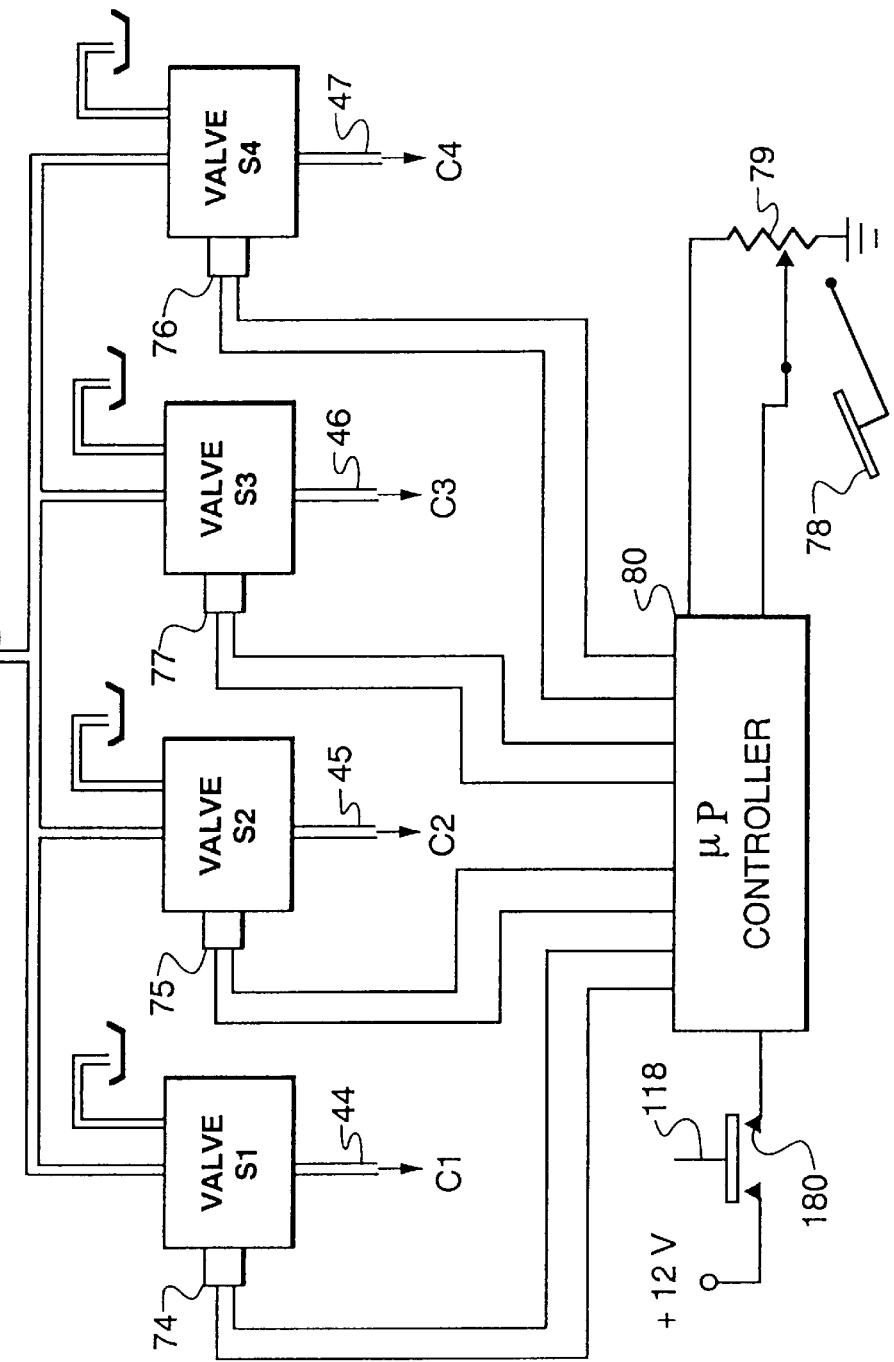

AUTOMATIC CLUTCH ENGAGEMENT CONTROLLED BY ENGINE SPEED

RELATED APPLICATIONS

This application incorporates by reference the disclosures of the application of Bulgrien et al. serial no. 209,914 filed Mar. 14, 1994, now U.S. Pat. No. 5,450,768, and the application of Pearce et al. serial no. 710,363 filed Jun. 3, 1991, now U.S. Pat. No. 5,101,688.

FIELD OF THE INVENTION

The present invention relates to a transmission control system for tractors. More particularly, the invention provides a system in which an inching or feathering clutch or clutches may be controlled as a function of engine speed.

BACKGROUND OF THE INVENTION

Many modern tractor transmissions use microprocessor controlled clutches for inching or feathering. The microprocessor based Electronic Control Units (ECUs) in several tractor models manufactured by New Holland North America, Inc. utilize engine speed, output speed and brake pedal switch inputs and currently provide torque-vs-clutch pedal position control and torque-vs.-time control for inching clutch engagement as well other features. Transmissions of this type are described in U.S. Pat. Nos. 5,101,688 to Pearce et al. and U.S. Pat. No. 5,450,768 to Bulgrien et al.

SUMMARY OF THE INVENTION

An object of the present invention is to provide a novel method and apparatus for controlling clutch engagement in a transmission as a function of the speed of the engine driving the transmission.

Another object of the invention is to provide a transmission control system for a tractor or other vehicle, wherein torque transferred by a feathering clutch is controlled as a function of engine speed. This mode of control simulates operation of a centrifugal clutch but provides greater flexibility. The tractor or other vehicle may be driven using the brake pedals and a foot throttle, much like driving an automatic transmission.

A further object of the invention is to provide, in a vehicle transmission system including a transmission having an input shaft driven by an engine, an output shaft, and a clutch for controlling the transfer of torque from the input shaft to the output shaft, a method of controlling the clutch, the method comprising; sensing the speed of the engine and controlling engagement of the clutch according to the sensed engine speed whereby the transmission of torque from the input shaft to the output shaft is determined by the speed of the engine.

Yet another object of the invention is to provide a vehicle transmission system comprising: an engine driving an input shaft; an output shaft; a transmission having a clutch for transferring torque from the input shaft to the output shaft; a sensor for sensing the speed of the engine; and, a controller responsive to the sensor for controlling engagement of the clutch in response to the sensed speed of the engine, whereby the transmission of torque from the input shaft to the output shaft is determined by the speed of the engine.

The transmission system normally operates in a first mode wherein a controller is responsive to positioning of a clutch pedal to control engagement of a clutch. An auto-clutch mode may be initiated by placing the transmission in gear and depressing the vehicle brake pedals while the engine speed is less than some predetermined value. The controller compares an auto-clutch torque value to an inching clutch value and uses the smaller of these values to control clutch engagement. In the first mode, the auto clutch torque value is set to a maximum and the inching torque value is determined by the position of the clutch pedal. In the auto-clutch mode, the inching torque value is again determined by the position of the clutch pedal but the auto clutch torque value is determined by the engine speed. When operating in the auto-clutch mode, the system automatically returns to the first mode when the clutch locks up. Clutch lock up is determined by sensing the engine speed and the speed of the transmission output shaft, computing the ratio of the two speeds, and comparing the computed ratio with a stored theoretical transmission ratio.

Other objects and advantages of the invention will become apparent upon consideration of the following description and the accompanying drawings.

BRIEF DESCRIPTION OF THE DRAWINGS

FIG. 2B shows the electro-hydraulic controls for the powershift clutches.

DESCRIPTION OF THE INVENTION

Figure 1:
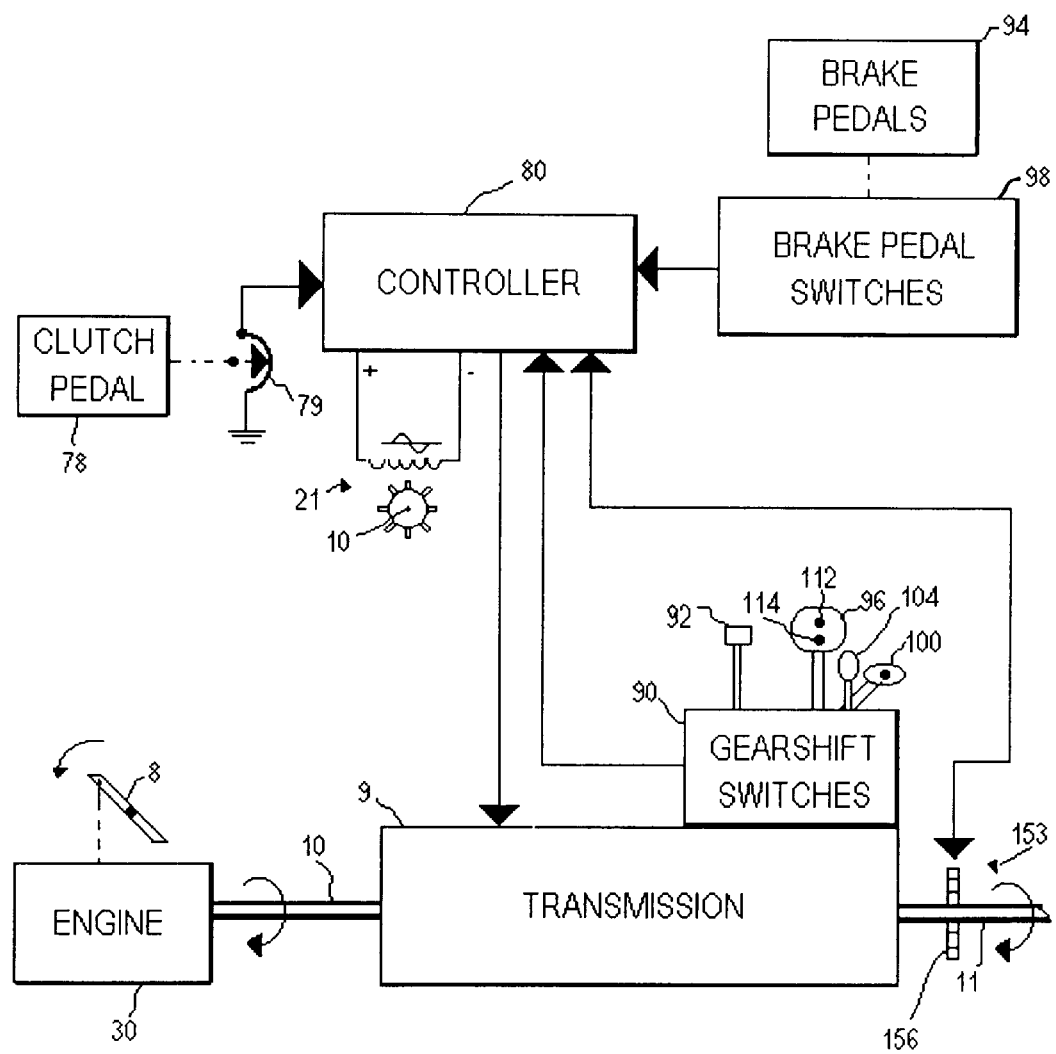
FIG. 1 is a schematic block diagram of a transmission control system according to the invention.

FIG. 1 illustrates a transmission system employing an auto-clutch control according to the present invention. The transmission system comprises a tractor engine 30 driving the input shaft 10 of a transmission 9 having an output shaft 11 for driving the tractor wheels (not shown). A controller 80 controls transmission 9 in response to digital signals applied to the controller 80 from gearshift switches 90 and brake pedal switches 98, and an analog signal generated by a potentiometer 79 in response to operation of a clutch pedal 78. The controller includes a microprocessor such as a type 80C196 and additional ROM memory for permanently storing a computer program and tables of data.

Two brake pedals 94 are provided, each brake pedal operating a respective one of two brake pedal switches 98. Both a foot throttle 8 and a throttle lever 104 are provided to control the speed of the engine 30. An alternator 21, driven by engine 30, provides an alternating signal to controller 80 as an indication of engine speed and the speed of input shaft 10. An electromagnetic speed sensor 153 senses the rotation of output shaft 11 and supplies an alternating signal to the controller at a frequency proportional to the rate of shaft rotation.

A ground speed sensor 153 comprises toothed gear 156 fixed on output shaft 11 and a reluctance sensor 154 that senses passage of the gear teeth and produces a sinusoidal output signal. The controller 80 measures the time between cycles of the output signal and filters the information in order to derive a value indicating tractor ground speed.

Engine speed is determined in a similar manner using signals from the alternator 21.

The invention will be described as applied to the transmission system described in Bulgrien et al. U.S. Pat. No. 5,450,768. The patented transmission system is a powershift transmission system using multiple shift levers but it will be obvious from the following description that the invention may also be utilized in full powershift transmissions without shift levers and in transmissions with mechanical shift levers.

Figure 2A:
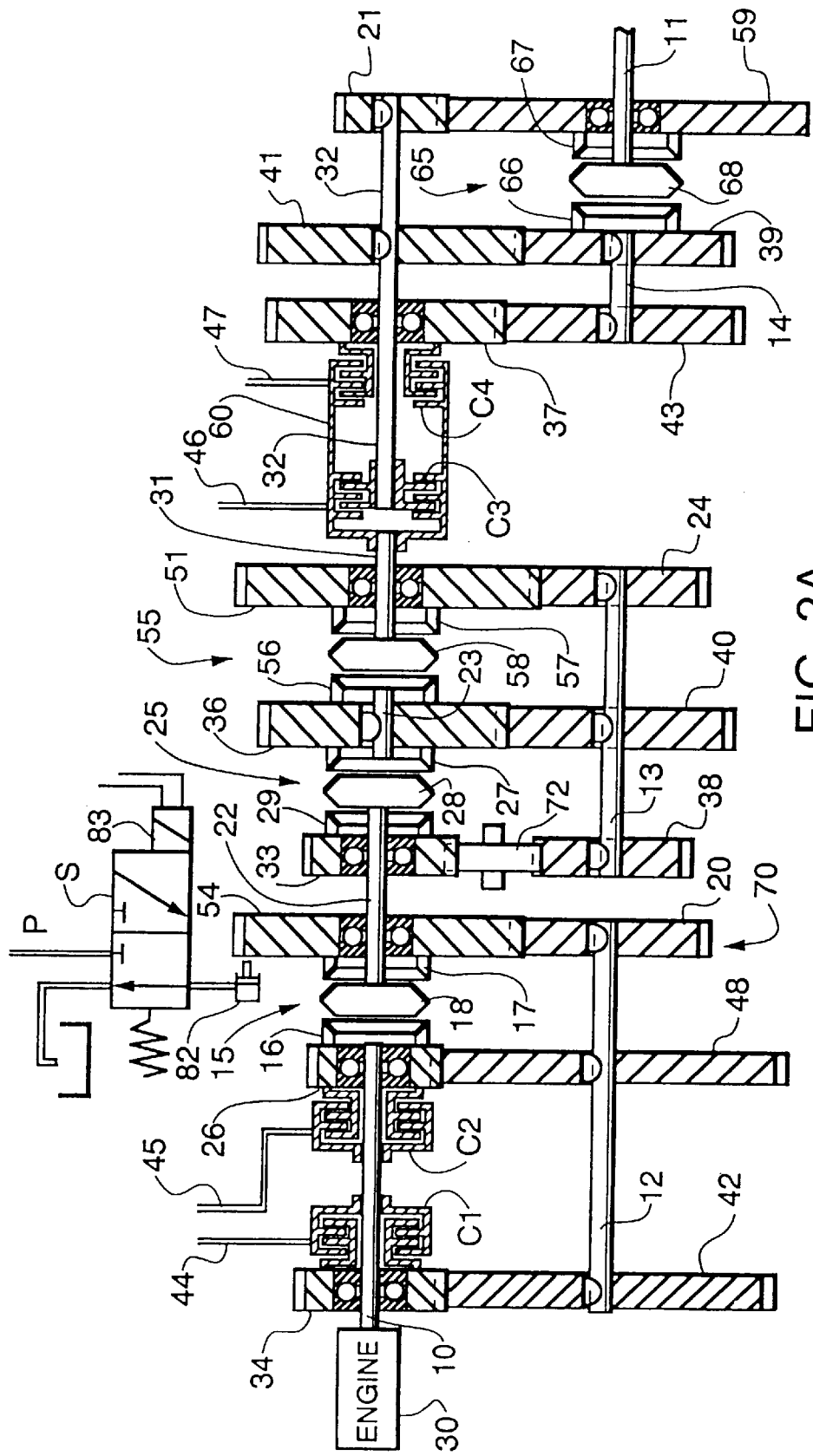
FIG. 2A shows a microprocessor-controlled powershift transmission with which the present invention may be utilized.

FIG. 2A is a schematic representation of the transmission 9. The mechanical aspects of this transmission are fully described in Pearce et al. U.S. Pat. No. 5,101,688 hence only those features necessary for an understanding of the present invention will be described. Briefly, the transmission includes two synchronized couplers 55, 65 and four electro-hydraulically actuated powershift clutches C1, C2, C3, C4 for selectively connecting input shaft 10 to output shaft 11 at any one of 16 forward gear speed ratios.

A high/low shift lever 92 (FIG. 1) is mechanically linked to coupler 65 while a 4/5 shift lever 96 is mechanically linked to coupler 55. By shifting lever 92, an operator may select a high or a low range of speed ratios each range including eight ratios. By shifting lever 96 an operator may select a range that includes the lower four or the higher four ratios within the range selected by lever 92. The controller 80 stores a gear variable that is incremented or decreased in response to actuation of Up-shift and Down-shift push buttons 112, 114 provided on the shift lever 96. The value of the variable determines which one of the clutches C1, C2 and which one of the clutches C3, C4 is actuated to select one powershift speed ratio within the range of four ratios specified by the settings of shift levers 92 and 96.

Figure 3:
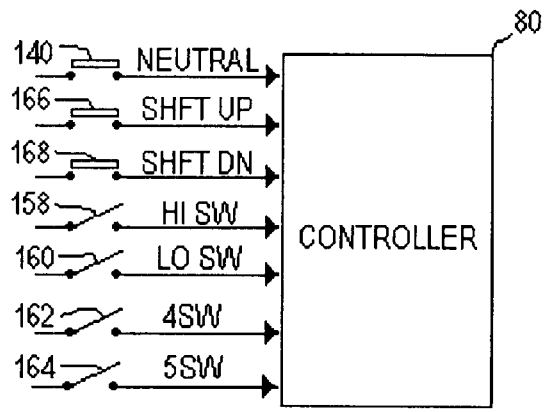
FIG. 3 is an electrical diagram illustrating certain inputs to the transmission controller.

The high/low shift lever 92 closes a Hi switch 158 or a Lo switch 160 (FIG. 3) depending on whether the lever is set to select the high or low range of speed ratios, respectively. In like manner, the 4/5 shift lever 96 closes a 4 switch 162 or a 5 switch 164 depending on whether the lever is set to select the lower four or higher four ratios within the range selected by lever 92.

A synchronized forward/reverse coupler 25 (FIG. 2A) is mechanically linked to a forward/reverse lever 100 (FIG. 1) thus permitting output shaft 11 to be driven at one of sixteen forward or sixteen reverse speed ratios relative to input shaft 10. Lever 100 has a center "neutral" position and when the lever is in neutral a switch 140 (FIG. 3) is closed.

The controller 80 senses the Hi/Lo switches 158/160, the 4/5 switches 162/164 and the shift up/ down switches 166/168 to determine the selected gear ratio, and from the selected gear ratio determines which of the clutches C1 or C2 and which of the clutches C3 or C4 is to be engaged. U.S. Pat. No. 5,101,688 describes the program executed by controller 80 to determine which clutches are to be engaged.

As shown in FIG. 2B, a source P of hydraulic fluid under pressure is connected via four valves S1–S4 and four hydraulic flow lines 44–47 to the clutches C1–C4 respectively. The valves S1, S2, S3 and S4 are controlled by solenoids 74, 75, 77 and 76, respectively. After the controller 80 determines which clutches must be engaged, it applies signals to one of the solenoids 74 or 75 and one of the solenoids 76 or 77 to cause engagement of one of the clutches C1 or C2 and one of the clutches C3 or C4.

Clutches C3 and C4 are used as the feathering or inching clutches. The valves S3 and S4 controlling pressure acting on the pistons in these clutches are proportional control valves. After the controller 80 has determined which of the clutches C3 or C4 is to be engaged, it generates a pulse-width-modulated (PWM) signal that is applied to the solenoid of valve S3 or S4. The magnitude (duty cycle) of the PWM signal controls the clutch pressure thereby controlling torque transmission through the clutch.

Figure 4A:
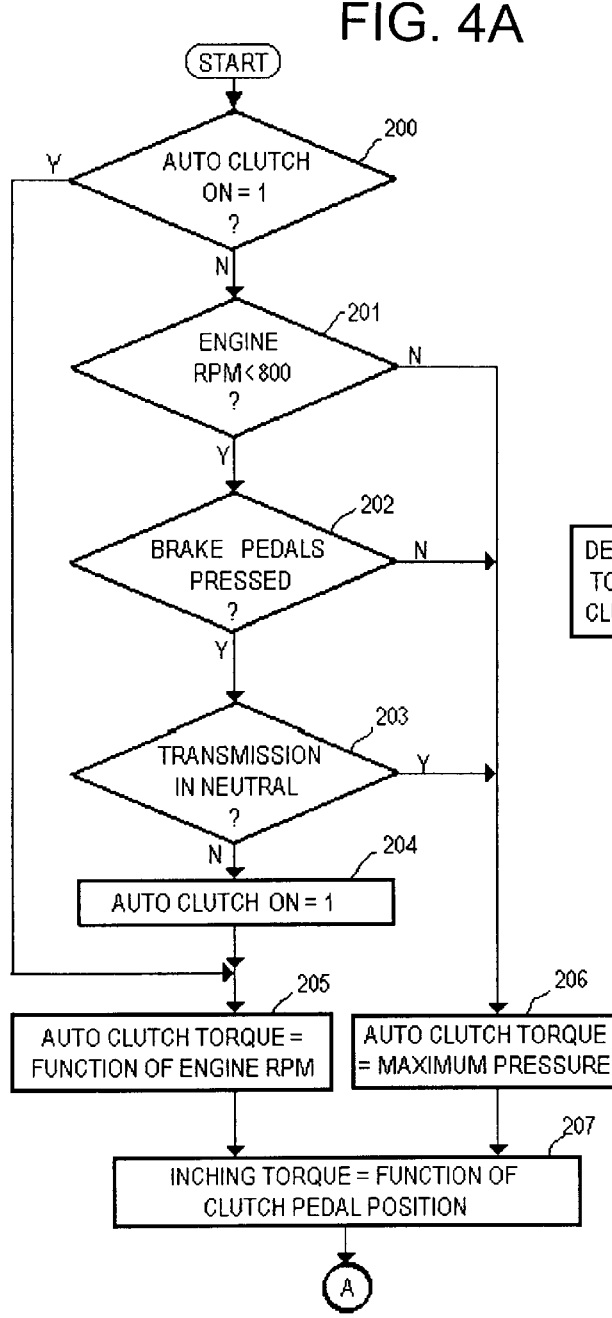
FIGS. 4A and 4B comprise a flow diagram illustrating the steps of a routine executed by the controller to implement the auto-clutch control feature.
Figure 4B:
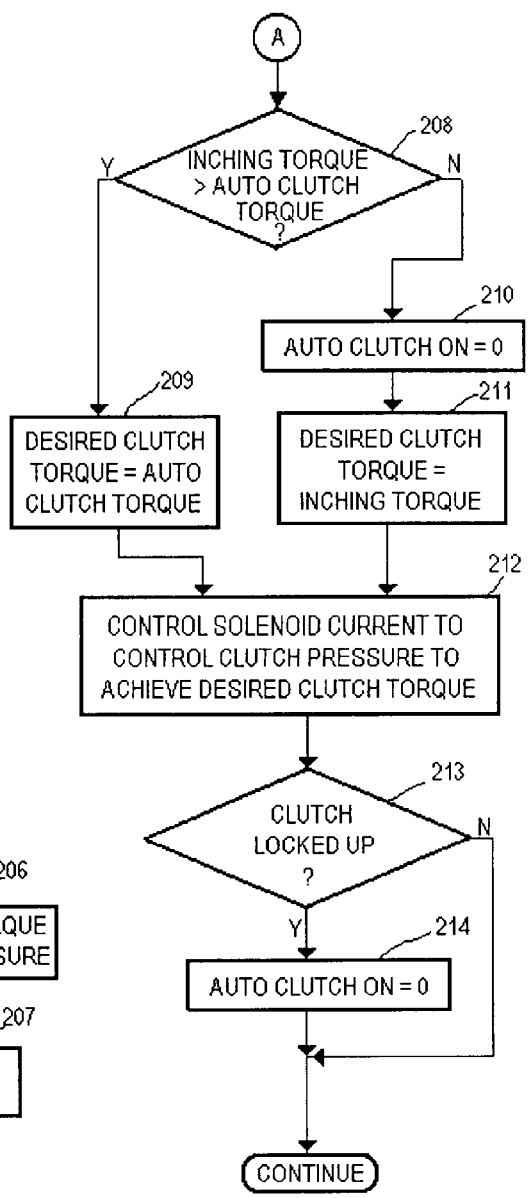

FIGS. 4A and 4B show a routine executed by controller 80 to control clutch torque in a 'normal' mode as a function of the position of clutch pedal 78 or, alternatively, control clutch torque in the auto-clutch mode as a function of engine speed. It will be understood that the illustrated routine is periodically executed as part of a computer program as described in Pearce et al. U.S. Pat. No. 5,101,688. In describing FIGS. 4A and 4B, it will be also be understood that references to 'the clutch' mean clutch C3 or C4 since the controller 80 energizes one or the other of these clutches depending on the gear ratio selected by the operator. The routine begins at step 200 by testing an AUTO-CLUTCH flag. This flag is set only during intervals the auto-clutch feature is in effect, and is initially cleared.

Next, the routine tests for the conditions necessary to invoke the auto-clutch mode. Step 201 checks the engine speed which is determined from the frequency of the output signal from the engine driven alternator 21. The auto-clutch mode may be initiated only if the engine speed is less than 800 rpm. If the engine speed is equal to, or greater than 800 rpm, the routine jumps to step 206. On the other hand, if the engine speed is less than 800 rpm the brake pedal switches 98 are tested at step 202.

The speed of 800 RPM is not critical. The speed should be low but distinguishable from the low idle speed of engine 30. In the tractor used for testing the invention, the low idle speed was 650 RPM. When the auto-clutch mode was in effect, an engine speed of 800 RPM resulted in approximately 6% of the maximum engine torque being transmitted through the clutch. This insured that the clutch was 'filled' so as to provide fast response to changes in engine speed while at the same time limiting any jerk or sudden movement of the tractor at the time the auto-clutch mode was invoked.

The auto-clutch feature may be initiated only if the operator is pressing both brake pedals. If step 202 determines that both brake pedals are not pressed, the routine jumps to step 206. On the other hand, if step 202 determines that both brake pedals are pressed, step 203 tests switch 140 to determine if the transmission is in neutral, that is, if the forward/reverse lever 100 is in its neutral position.

The auto-clutch feature is initiated only if the transmission is not in neutral. If step 203 determines that the transmission is in neutral, the routine jumps to step 206. Step 206 loads a controller storage location designated AUTO CLUTCH TORQUE with a value that, if used to generate a PWM signal for controlling solenoid valve S3 or S4 (FIG. 2B), results in maximum clutch pressure in clutch C3 or C4.

Next, step 207 loads a storage location INCHING TORQUE with a value that, if used to generate a PWM signal for controlling the clutch, results in a clutch pressure that is dependent on the position of clutch pedal 78. At step 207 the controller 80 uses a digital conversion of the analog signal from potentiometer 79 to access a table of inching torque values to obtain the value that is loaded into location INCHING TORQUE.

At step 208 the controller 80 compares the values in locations AUTO CLUTCH TORQUE and INCHING TORQUE. Since AUTO CLUTCH TORQUE was loaded at step 206 with a maximum value, the comparison at step 208 will determine that the value in location INCHING TORQUE is not greater than the value in AUTO CLUTCH TORQUE. Step 210 tends to clear the AUTO-CLUTCH ON flag which is already cleared. Step 211 is then executed to load a storage location DESIRED CLUTCH TORQUE with the value entered into location INCHING TORQUE at step 207.

The value in location DESIRED CLUTCH TORQUE is used to control the duty cycle of the PWM signal applied to the solenoid of valve S3 or S4 to thereby control the clutch pressure of clutch C3 or C4. At step 212 the controller generates the PWM signal, the signal being applied to solenoid 76 or 77 depending on gear selection. This controls engagement of the selected clutch. Step 213 then tests to see if the selected clutch is fully engaged.

Full clutch engagement is determined by computing the speed ratio between input shaft 10 and output shaft 11 and comparing the computed speed ratio with a value from a table of theoretical speed ratio values. The table holds one value for each possible gear ratio and is addressed according to the gear selected by the shift levers and the buttons 112 and 114. The input shaft speed is determined by sensing the output of alternator 21 and the output shaft speed is determined by speed sensor 153.

Initially, the selected clutch will not be locked up so the routine skips step 214 and the program continues. The routine is repeated at periodic intervals. During this time the operator will normally be releasing clutch pedal 78 so as to increase the torque transmitted through the selected clutch C3 or C4. Step 207 loads larger values into location INCHING TORQUE but these values are all less than the maximum value loaded into location AUTO CLUTCH TORQUE at step 206. The comparison at step 208 thus finds that the value in location INCHING TORQUE is not greater than the value in location AUTO CLUTCH TORQUE. The new value in location INCHING CLUTCH TORQUE is then loaded into location DESIRED CLUTCH TORQUE (step 211) to control the generation of the PWM signal that is applied to solenoid 76 or 77. This results in a greater pressure in the selected clutch so that a greater torque is transmitted through the clutch. Step 213 then checks to determine if the selected clutch is locked up.

If the operator has released the clutch pedal sufficiently such that the clutch is locked up, step 214 is executed to clear the AUTO CLUTCH ON flag (already cleared).

An operator may initiate the auto-clutch mode of operation by moving the forward/reverse lever 100 out of its neutral position while both brake pedals 94 are depressed, the clutch pedal is up, and the tractor engine 30 is running at idle speed. In FIG. 4A, at step 200, controller 80 tests the AUTO CLUTCH ON flag that is initially cleared. Step 201 then checks the engine speed to determine if the engine rpm is below 800, step 202 senses the brake pedal switches 98 to determine if both brake pedals are depressed, and step 203 samples the switch 140 to determine if the transmission is in gear, that is, not in neutral. If the conditions tested for at steps 201–203 are all met, the AUTO CLUTCH ON flag is set at step 204. Step 205 then calculates AUTO CLUTCH TORQUE using the sensed engine speed and a stored function.

At step 207, the controller 80 senses the position of clutch pedal 78 and calculates an inching torque value that is loaded into location INCHING TORQUE as previously described. Since the clutch pedal is fully released the highest inching torque value is loaded into location INCHING TORQUE.

Step 208 then compares the values in locations AUTO CLUTCH TORQUE and INCHING TORQUE. On at least the first execution of step 208 after the AUTO CLUTCH ON flag is set at step 204, the comparison will find that the value in location INCHING TORQUE is greater than the value in location AUTO CLUTCH TORQUE. Step 209 is executed to load the value in location AUTO CLUTCH TORQUE into location DESIRED CLUTCH TORQUE. STEP 212 uses the value in DESIRED CLUTCH TORQUE to generate the PWM signal that is applied to solenoid 76 or 77 to control clutch C3 or C4.

In the manner previously described, step 213 determines if the clutch is locked up. On this first execution of the routine after the AUTO CLUTCH ON flag is set, the clutch will not be locked up so step 214 is bypassed and the program continues.

On the next execution of the routine, the test at step 200 finds that the AUTO CLUTCH ON flag is set so the routine jumps directly to step 205, bypassing steps 201–203. The rest of the routine shown in FIGS. 4A and 4B is executed as previously described. This continues as long as the operator does not depress the clutch pedal 78 and the clutch is not locked up. Once the AUTO CLUTCH ON flag is set, the operator may release the brake pedals without affecting execution of the routine.

Figure 5:
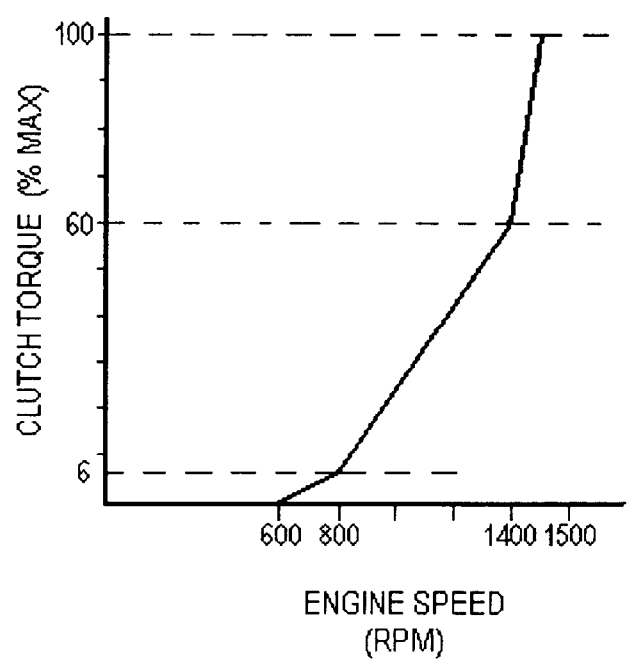
FIG. 5 is a graph illustrating engine speed versus percent of maximum torque available from the engine transferred through a feathering clutch.

Consider the case where the clutch pedal remains fully released during a period when the engine speed is being increased. As the engine speed increases, repeated executions of the routine cause successively larger values to be loaded into location AUTO CLUTCH TORQUE at step 205 and transferred to location DESIRED CLUTCH TORQUE at step 209 to increase the duty cycle of the PWM signal applied to solenoid 76 or 77 at step 212. This causes successive increases in the clutch pressure in clutch C3 or C4. The increase in clutch pressure need not be linear with respect to engine speed as illustrated in FIG. 5. Eventually, the clutch pressure is increased to a point where the clutch (C3 or C4) is locked up. The locked condition of the clutch is detected at step 213 and the AUTO CLUTCH ON flag is cleared at step 214. This terminates the auto-clutch mode. Maximum clutch torque, controllable by the position of the clutch pedal, is again available.

The preceding description of operation in the auto-clutch mode assumed an ever-increasing engine speed until clutch lock up. In actual practice, the operator may vary the engine speed upwardly or downwardly, or keep the engine speed constant by operation of a foot throttle 8 so that clutch pressure is increased, decreased, or held constant. That is, the operator may slip the clutch using engine speed, similar to the way a clutch is slipped using the clutch pedal to inch the tractor.

Furthermore, the operator may terminate the auto-clutch mode before the engine speed is increased to the point where the clutch locks up. Assume that before the clutch locks up the operator depresses the clutch pedal. As the clutch pedal is depressed, smaller values are loaded into location INCHING TORQUE at step 207. At some point the comparison at step 208 determines that the value in location INCHING TORQUE is greater than the value in AUTO CLUTCH TORQUE so the AUTO CLUTCH ON flag is cleared at step 210 to terminate the auto-clutch mode of operation. The value in location INCHING CLUTCH TORQUE is loaded into location DESIRED CLUTCH TORQUE at step 211 so that clutch engagement is controlled by the position of the clutch pedal.

From the foregoing description it is seen that the present invention provides a novel method and apparatus wherein engagement of a clutch in a transmission is controlled according to the speed of the engine driving the transmission. The apparatus permits optional operator control of the clutch pressure by engine speed or clutch pedal position. The invention may be implemented in prior art tractors without physical modification of the tractor. Only modification of the program executed by the controller is required to permit two-pedal driving like an automatic transmission.

Although the invention has been described as applied to a specific prior art tractor transmission, it should be evident that the invention may be used to control clutch engagement in vehicles other than tractors and in transmissions other than the powershift transmission described herein. It is intended therefore that the present invention be limited only by the scope of the appended claims.

I claim:

1. In a vehicle transmission system including a transmission having an input shaft driven by an engine, an output shaft, and a clutch for controlling the transfer of torque from said input shaft to said output shaft, a method of controlling said clutch, said method comprising:

sensing the speed of said engine by using a sensor;

controlling engagement of said clutch according to the sensed engine speed by using a controller responsive to the sensor, whereby the transmission of torque from said input shaft to said output shaft is determined by the speed of said engine, wherein the controller is also responsive to a brake pedal switch, and sensing means for indicating whether the transmission is in gear or in neutral; and invoking in auto-clutch mode for the controller to control engagement of the clutch according to engine speed when the brake switch is operated by a brake pedal, the transmission is in gear, and the sensed engine speed is less than a predetermined value.

2. A vehicle transmission system comprising:

an engine driving an input shaft;

an output shaft;

a transmission having a clutch for transferring torque from said input shaft to said output shaft;

a sensor for sensing the speed of said engine;

a controller responsive to said sensor for controlling engagement of said clutch in response to the sensed speed of said engine, whereby the transmission of torque from said input shaft to said output shaft is determined by the speed of said engine;

a clutch pedal, the controller, in a first mode, being responsive to operation of the clutch pedal to control engagement of the clutch and operable in an auto-clutch mode to control engagement of the clutch according to the speed of the engine; and a brake pedal and a brake pedal switch operable by the brake pedal, the transmission including a lever for selectively placing the transmission in gear or in neutral, sensing means operable by the lever for indicating whether the transmission is in gear or in neutral, the controller being responsive to the brake pedal switch, the sensing means, and the sensed engine speed for invoking the auto-clutch mode of operation when the brake pedal is pressed, the transmission is in gear, and the sensed engine speed is less than a predetermined value.

3. A vehicle transmission system as claimed in claim 2 wherein, once said auto-clutch mode of operation is invoked, said controller returns to said first mode of operation when said clutch locks up.

4. A vehicle transmission system as claimed in claim 3 and further comprising a sensor for sensing the speed of said output shaft, said controller determining when said clutch locks up by sensing the engine speed and said speed of said output shaft, computing the ratio of the sensed engine speed to the sensed output shaft speed, and comparing the computed ratio to a stored theoretical ratio.

5. A vehicle transmission system as claimed in claim 3 wherein said controller is a microprocessor that executes a program to compare an inching torque value to an auto clutch value and uses the smaller of the inching clutch and auto clutch values to control engagement of said clutch, said controller, when operating in said first mode, setting said auto clutch value at a maximum value and setting said inching torque value at a value determined by the position of said clutch pedal, and when operating in said auto clutch mode, setting said auto clutch value at a value determined by the sensed engine speed and setting said inching torque value at a value determine by the position of said clutch pedal.

6. A vehicle transmission system as claimed in claim 5 wherein said controller uses said smaller value to generate a pulse-width-modulated control signal for controlling said clutch.

7. A vehicle transmission system as claimed in claim 6 and further comprising a solenoid operated valve for controlling said clutch, said pulse-width-modulated signal being applied to said solenoid operated valve.

8. A vehicle transmission system as claimed in claim 2 wherein said system includes a second brake switch operated by a second brake pedal, said auto-clutch mode being invoked only if said brake pedal and said second brake pedal are simultaneously depressed.

9. A vehicle transmission system as claimed in claim 2 wherein said vehicle is a tractor.

10. A vehicle transmission system, employing an auto-clutch control, comprising:

an engine driving an input shaft;

an output shaft;

a transmission having a clutch for transferring torque from the input shaft to the output shaft;

a clutch pedal;

a sensor for sensing the speed of the engine; and a controller connected to be responsive to the sensor for controlling engagement of the clutch in response to the sensed speed of the engine and to the clutch pedal for controlling engagement of the clutch in response to a position of the clutch pedal, wherein the controller operates to determine transmission of torque from the input shaft to the output shaft as a function of the sensed speed of the engine when the controller is in an auto-clutch mode, and when the controller is in a normal mode, operation of the controller results in transmission of torque from the input shaft to the output shaft as a function of the position of the clutch pedal.

11. A vehicle transmission system as recited in claim 10, wherein the controller operates in the normal mode when the engine speed is equal to, or greater than, a predetermined value.

12. A vehicle transmission system as recited in claim 11, further comprising:

a brake pedal switch operable by a brake pedal, and the transmission includes a lever for selectively placing the transmission in gear or in neutral; and sensing means operable by the lever for indicating whether the transmission is in gear or in neutral, wherein the controller is responsive to the brake pedal switch, the sensing means, and the sensed engine speed so as to invoke the auto-clutch mode of operation when the brake pedal is pressed, the transmission is in gear, and the sensed engine speed is less than the predetermined value.

13. A vehicle transmission system as recited in claim 11, further comprising:

a brake pedal switch operable by a brake pedal, and the transmission includes a lever for selectively placing the transmission in gear or in neutral; and sensing means operable by the lever for indicating whether the transmission is in gear or in neutral, wherein the controller is responsive to the brake pedal switch, the sensing means, and the sensed engine speed so as to invoke the auto-clutch mode of operation when the brake pedal is pressed, the transmission is in gear, and the sensed engine speed is less than the predetermined value.

* * * * *